United States Patent
Homma et al.

(10) Patent No.: US 9,128,526 B2
(45) Date of Patent: Sep. 8, 2015

(54) OPERATION CONTROL DEVICE, OPERATION CONTROL METHOD, AND COMPUTER-READABLE RECORDING MEDIUM FOR DISTINGUISHING AN INTENDED MOTION FOR GESTURE CONTROL

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 1500 days.

(21) Appl. No.: 12/791,357

(22) Filed: Jun. 1, 2010

(65) Prior Publication Data

US 2010/0325590 A1    Dec. 23, 2010

(30) Foreign Application Priority Data

Jun. 22, 2009   (JP) ................. P2009-147726

(51) Int. Cl.
| | |
|---|---|
| G06F 3/033 | (2013.01) |
| G06F 3/041 | (2006.01) |
| G06F 3/01 | (2006.01) |
| G06K 9/00 | (2006.01) |
| G06F 3/0346 | (2013.01) |
| G06F 3/0481 | (2013.01) |

(52) U.S. Cl.
CPC ............. *G06F 3/017* (2013.01); *G06F 3/011* (2013.01); *G06F 3/012* (2013.01); *G06F 3/0346* (2013.01); *G06F 3/0481* (2013.01); *G06K 9/00335* (2013.01); *G06K 9/00362* (2013.01)

(58) Field of Classification Search
CPC ......... G06F 3/011; G06F 3/012; G06F 3/017; G06F 3/0346; G06F 3/0481; G06K 9/00335; G06K 9/00362; G06K 9/00375

USPC ........... 715/702, 854, 863; 345/173; 348/164
See application file for complete search history.

(56) References Cited

U.S. PATENT DOCUMENTS

| | | | | |
|---|---|---|---|---|
| 2002/0126090 | A1* | 9/2002 | Kirkpatrick et al. | 345/158 |
| 2004/0161132 | A1* | 8/2004 | Cohen et al. | 382/103 |
| 2005/0271252 | A1* | 12/2005 | Yamada | 382/103 |
| 2006/0274947 | A1* | 12/2006 | Fujimura et al. | 382/201 |

FOREIGN PATENT DOCUMENTS

| | | | |
|---|---|---|---|
| JP | 2005-031799 | | 2/2005 |
| WO | WO9935633 | * | 1/1999 |

OTHER PUBLICATIONS

JP 2005-031799 ENG translation (published on Mar. 2, 2005).*

* cited by examiner

*Primary Examiner* — Boris Pesin
*Assistant Examiner* — Rinna Yi
(74) *Attorney, Agent, or Firm* — Sherr & Jiang, PLLC

(57) ABSTRACT

An apparatus and method provide logic for controlling a controllable device by distinguishing between an intended motion of a user and an unintended motion of the user. In one implementation, a computer-implemented method is provided to control a controllable device by distinguishing between a control movement and a non-control movement. The method receives spatial positions of a joint of a human appendage and a reference point disposed along the appendage and distal to the joint. The method determines whether a movement of the reference point about the joint is a control movement or a non-control movement, based on a comparison of direction of movement of the reference point and a direction of displacement between the reference point and the upper joint. A control instruction is executed when the movement is a control movement.

28 Claims, 9 Drawing Sheets state (a)

state(b)

FIG. 6 state (a)

state(b)

OPERATION CONTROL DEVICE, OPERATION CONTROL METHOD, AND COMPUTER-READABLE RECORDING MEDIUM FOR DISTINGUISHING AN INTENDED MOTION FOR GESTURE CONTROL

CROSS-REFERENCE TO RELATED APPLICATIONS

This application is based upon and claims the benefit of priority from Japanese Patent Application No. 2009-147726, filed Jun. 22, 2009, the entire contents of which are incorporated herein by reference.

BACKGROUND OF THE INVENTION

1. Field of the Invention

The present invention relates to an operation control device, an operation control method, and a computer-readable recording medium for gestural control of a controllable device.

2. Description of the Related Art

With the developments in IT, sophisticated electronic equipment has become widespread. As the electronic equipment becomes more sophisticated, instruction contents from a user for causing the electronic equipment to execute a function become diversified. Consequently, the demands on a User Interface (UI) which is easy to understand and has excellent operability are increasing. For example, with regard to a personal computer (hereinafter, referred to as "PC"), a character based UI, in which a command character string is input by a user using a keyboard, has been mainly used conventionally. Recently, however, a Graphical User Interface (GUI) has been widely used, which is a user interface in which an image such as an icon or a window shown on a display screen is operated with a pointer on the display screen by a user using a pointing device such as a mouse to thereby input an instruction.

The operability of the electronic equipment such as PC has been improved by using the GUI. However, there are still some users who are not getting used to the operation of a mouse and the like and feel uncomfortable to operate them, and hence, the operability is not good for all users. Consequently, there is demanded development of a UI in which an instruction can be input more intuitively and naturally. For example, a motion of moving a part of the body of the user in space is associated with an operation content which can be easily imagined intuitively from the motion, and then a predetermined operation can be executed by the user moving his/her body.

Figure 9:
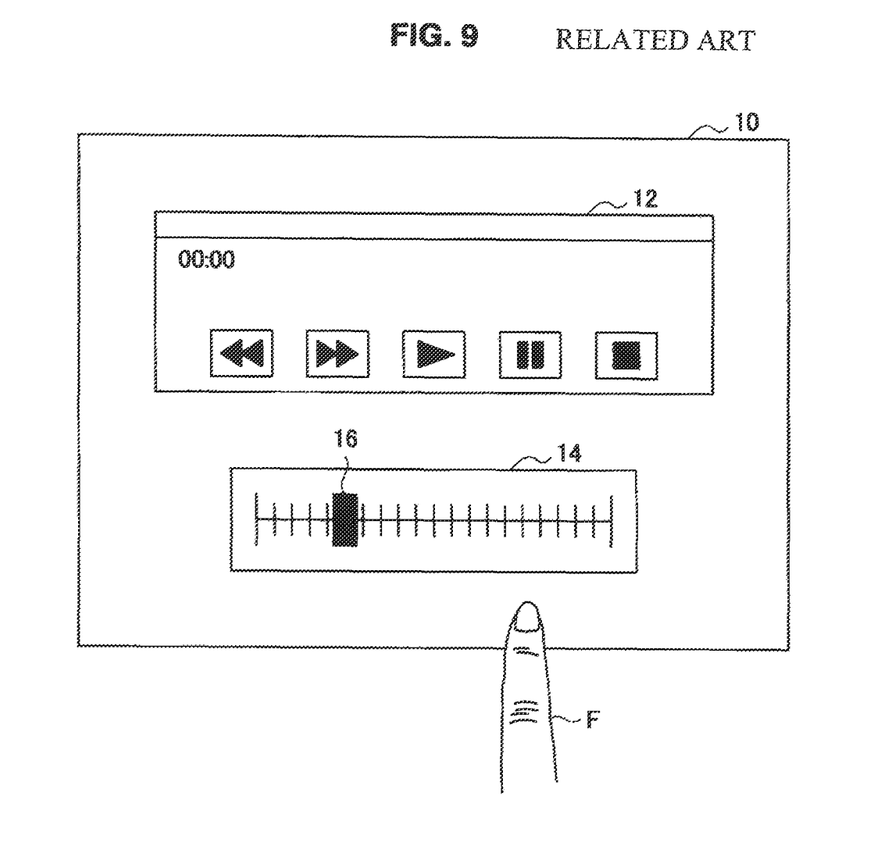
FIG. 9 is an explanatory view showing an operation method performed by a conventional movement gesture.

For example, as shown in FIG. 9, displayed on a screen 10 are a reproduction operation section 12 for performing operations such as reproducing, fast-forwarding, fast-rewinding, and stopping music or video, and a volume control section 14 for operating volume. In this case, the user can operate the reproduction operation section 12 and the volume control section 14 in such manners that the reproduction state of music is changed and the volume is controlled by moving a finger F left and right. Further, for example, there is disclosed a control system which can be operated by assigning up, down, left, and right movement operations using 5-way key, which is capable of performing selection/decision as well as moving a pointer or the like up, down, left, and right, to movement gestures of the user's arm, palm, finger, and other appendages in space (e.g., Japanese Patent Application Laid-Open No. 2005-31799).

SUMMARY

However, the movement gesture in such a manner that the user's arm, finger, or the like is moved up, down, left, and right necessarily causes a motion of the user's arm, finger, or the like returning to its initial position. That is, when a user repeatedly moves his/her finger in a right direction, for example, it is necessary for the user to move his/her finger in a left direction, from an end position of the movement motion in the right direction to a start position of the movement motion in the right direction. In the above-mentioned conventional input interface, there was an issue that the user's unintended operation of returning his/her finger or the like to its initial position was falsely detected as a movement gesture in a reverse direction with respect to the user's intended movement direction.

In light of the foregoing, it is desirable to provide a novel and improved operation control device, operation control method, and computer-readable recording medium, which can distinguish between the intended motion and the unintended motion from the motion of the user and which can enhance detection accuracy in the gesture in space.

According to exemplary embodiments of the present invention, there can be provided an apparatus, method, and computer-readable medium for controlling a controllable device that can distinguish between the intended motion and the unintended motion from the motion of the user and which can enhance detection accuracy in the gesture in space.

Consistent with a disclosed exemplary embodiment, a computer-implemented method controls a controllable device by distinguishing between a control movement and a non-control movement, the control movement being associated with a control instruction of the controllable device. The method includes receiving a spatial position of a joint of a human appendage, and a spatial position of reference point disposed along the human appendage and distal to the joint. The method identifies a direction of displacement between the joint and the reference point based on the received spatial positions, and computes a direction of a movement of the reference point with respect to the joint, based on a comparison between a stored spatial position of the reference point and the received spatial position of the reference point. The direction of displacement is specified relative to the joint, and the direction of movement is specified relative to the reference point. The method determines whether the movement of the reference point is a control movement or a non-control movement, based on at least a comparison of the identified direction of displacement and the computed direction of movement, and executes the control instruction when the movement is determined to be a control movement.

Consistent with another disclosed exemplary embodiment, an apparatus controls a controllable device by distinguishing between a control movement and a non-control movement, the control movement being associated with a control instruction of the controllable device. The apparatus includes a storage device and a processor coupled to the storage device. The storage device stores a program for controlling the processor. The processor, being operative with the program, is configured to cause the apparatus to receive a spatial position of a joint of a human appendage, and a spatial position of reference point disposed along the human appendage and distal to the joint. The apparatus identifies a direction of displacement between the joint and the reference point based on the received spatial positions, and computes a direction of a movement of the reference point with respect to the joint, based on a comparison between a stored spatial position of the reference point and the received spatial position of the reference point. The direction of displacement is specified relative to the joint, and the direction of movement is specified relative to the reference point. The apparatus determines whether the movement of the reference point is a control movement or a non-control movement, based on at least a comparison of the identified direction of displacement and the computed direction of movement, and executes the control instruction when the movement is determined to be a control movement.

Consistent with a further disclosed exemplary embodiment, computer readable media are provided to store instruction that, when executed by a processor, perform a method for controlling a controllable device by distinguishing between a control movement and a non-control movement, the control movement being associated with a control instruction of the controllable device. The method includes receiving a spatial position of a joint of a human appendage, and a spatial position of reference point disposed along the human appendage and distal to the joint. The method identifies a direction of displacement between the joint and the reference point based on the received spatial positions, and computes a direction of a movement of the reference point with respect to the joint, based on a comparison between a stored spatial position of the reference point and the received spatial position of the reference point. The direction of displacement is specified relative to the joint, and the direction of movement is specified relative to the reference point. The method determines whether the movement of the reference point is a control movement or a non-control movement, based on at least a comparison of the identified direction of displacement and the computed direction of movement, and executes the control instruction when the movement is determined to be a control movement.

DETAILED DESCRIPTION OF THE EXEMPLARY EMBODIMENT

Hereinafter, a preferred exemplary embodiment of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

Figure 1:
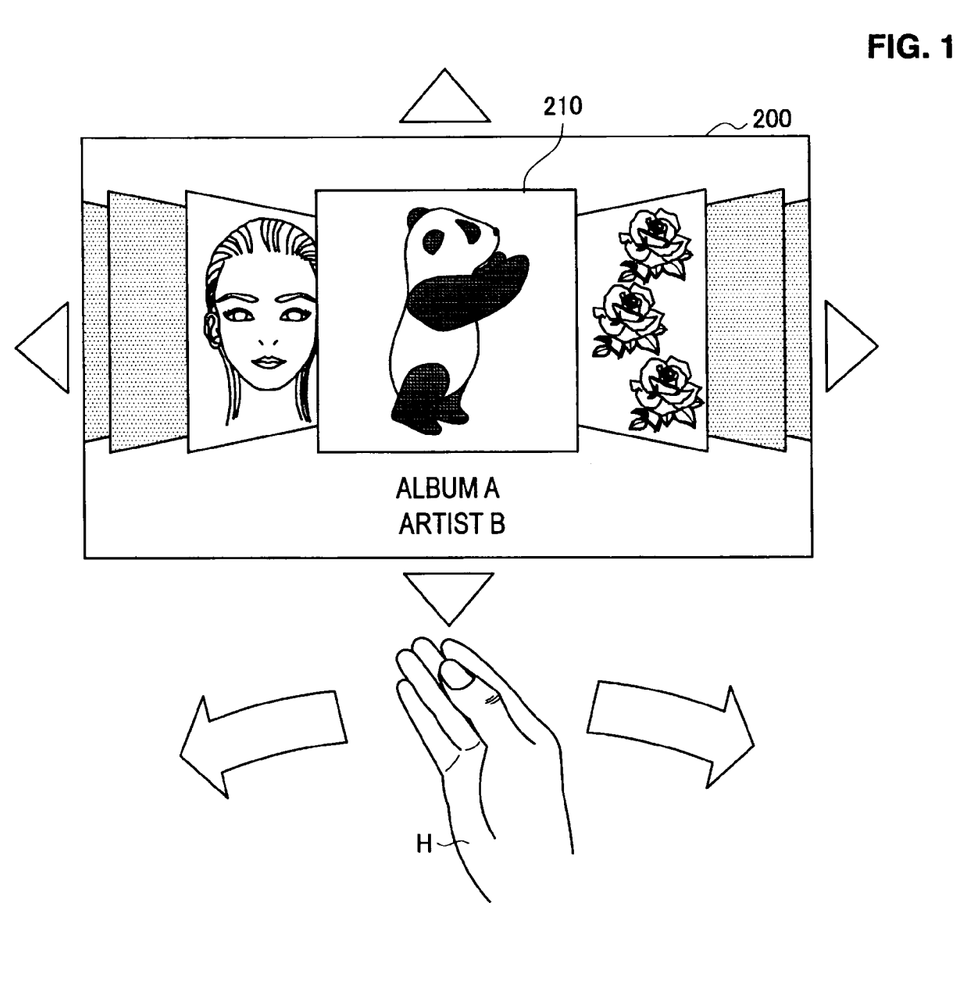
FIG. 1 is an explanatory view showing an example of a screen configuration which is operated by a gesture of a user.

1. Operation example of screen whose operation is controlled by operation control device
2. Configuration of operation control device
3. Operation control method performed by operation control device 1. Operation Example of Screen whose Operation is Controlled by Operation Control Device First, based on FIG. 1, there will be described an example of screen operation in which an operation control device according to an exemplary embodiment of the present invention recognizes the gesture of the user and the operation is being controlled. Note that FIG. 1 is an explanatory view showing an example of a screen configuration which is operated by a gesture of a user.

The present exemplary embodiment is targeted at an operation by using a 5-way key which is generally used as an interface for a TV or a game. For example, when the 5-way key is used, there can be easily performed an operation in such a manner that an object such as an icon displayed on a screen is scrolled up, down, left, and right and a pointer for selecting the object is caused to move, and an operation of selecting/deciding the object. The operation control device according to the present exemplary embodiment enables to execute the operation which is executable by using the 5-way key by the gesture of the user.

For example, the operation control device according to the present exemplary embodiment can detect a flick gesture of a hand H in up, down, left, or right direction, and can perform the interaction between the gesture and a screen corresponding to the direction. As the interaction between gesture and screen, there can be considered, as shown in FIG. 1 for example, an operation in which content 210, which is included in a content list displayed on a screen 200, is scrolled up, down, left, or right. When the hand H is moved in the right direction, the content list is scrolled in the right direction, and when the hand H is moved in the left direction, the content list is scrolled in the left direction. In the operation control device according to the present exemplary embodiment, it is desirable to prevent the false detection of a hand-returning motion caused by the flick gesture of the hand H. When the false detection of the hand-returning motion is prevented from occurring, no operation processing is executed with respect to the user's unintended motion, and hence the operability can be enhanced.

Note that, in the present exemplary embodiment: as for an operation such as deciding or selecting content, it is to be performed by another arbitrary gesture such as clenching and unclenching of the user's hand; and when the gesture of moving the hand H or the like up, down, left, and right is performed, only the scroll processing is to be executed. Hereinafter, there will be described in detail a configuration of an operation control device which can prevent false detection of a gesture and an operation control method performed by the operation control device.

2. Configuration of Operation Control Device

Hardware Configuration

First, based on FIG. 2, there will be described a hardware configuration of an operation control device 100 according to the present exemplary embodiment. Note that FIG. 2 is a block diagram showing the hardware configuration of the operation control device 100 according to the present exemplary embodiment.

Figure 2:
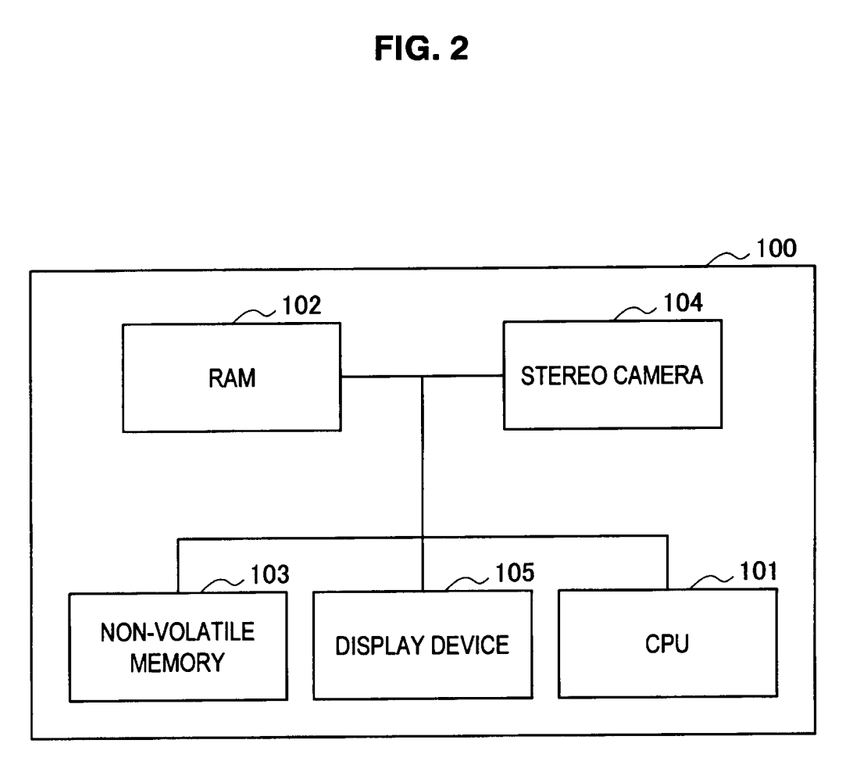
FIG. 2 is a block diagram showing a hardware configuration of an operation control device according to an exemplary embodiment of the present invention.

As shown in FIG. 2, the operation control device 100 according to the present exemplary embodiment includes a CPU (Central Processing Unit) 101, an RAM (Random Access Memory) 102, and a non-volatile memory 103. In addition, the operation control device 100 includes a stereo camera 104 and a display device 105.

The CPU 101 functions as an arithmetic processing unit and a control device, and controls the entire operation within the operation control device 100 in accordance with various kinds of programs. Further, the CPU 101 may be a microprocessor. The RAM 102 temporality stores a program used for the execution of the CPU 101, a parameter which appropriately changes in the execution, and the like. The RAM 102 and the CPU 101 are mutually connected with each other via a host bus which includes a CPU bus or the like. The non-volatile memory 103 stores a program, a calculation parameter, and the like which the CPU 101 uses. There may be used, for example, an ROM (Read Only Memory) and a flash memory for the non-volatile memory 103.

The stereo camera 104 is a detection device which can recognize a position in a depth direction. The stereo camera 104 simultaneously images, from different directions by using two cameras, a plurality of input parts moved by the user, and hence can also record information in the depth direction of a picked-up image. Instead of the stereo camera 104, there may also be used a range finder utilizing parallax and the like. The stereo camera 104 includes an imaging means for imaging the gesture performed by the user, an input control circuit for outputting a picked-up image imaged by the imaging means to the CPU 101, and the like. The stereo camera 104 acquires the gesture performed by the user, and hence can input various kinds of data and can provide an instruction of processing operation to the operation control device 100.

The display device 105 is an example of an output device for outputting information. As the display device 105, there can be used a CRT (Cathode Ray Tube) display device, a liquid crystal display (LCD) device, an OLED (Organic Light Emitting Diode) device, and the like.

Functional Configuration

Figure 3:
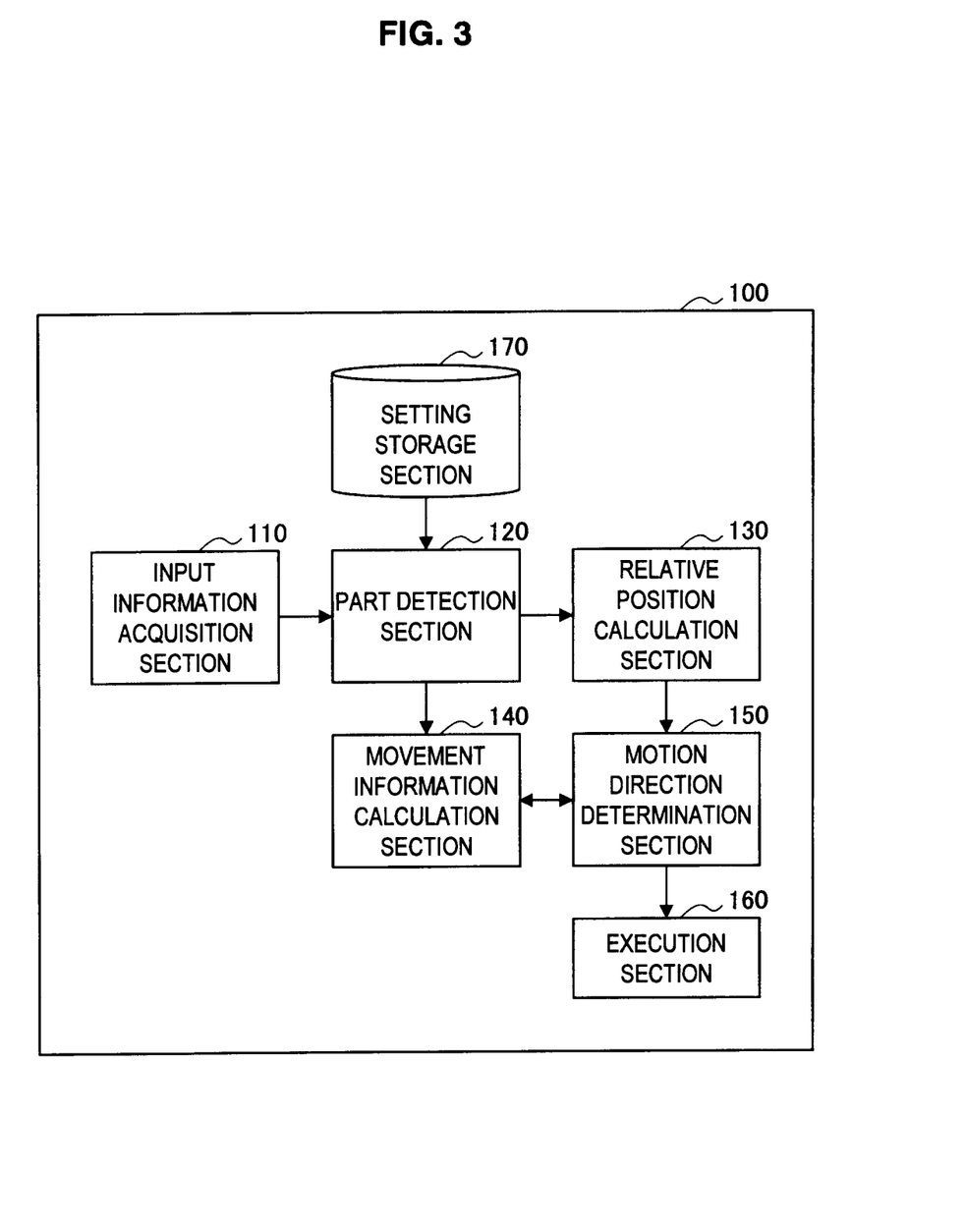
FIG. 3 is a functional block diagram showing a functional configuration of the operation control device according to the exemplary embodiment.
Figure 4:
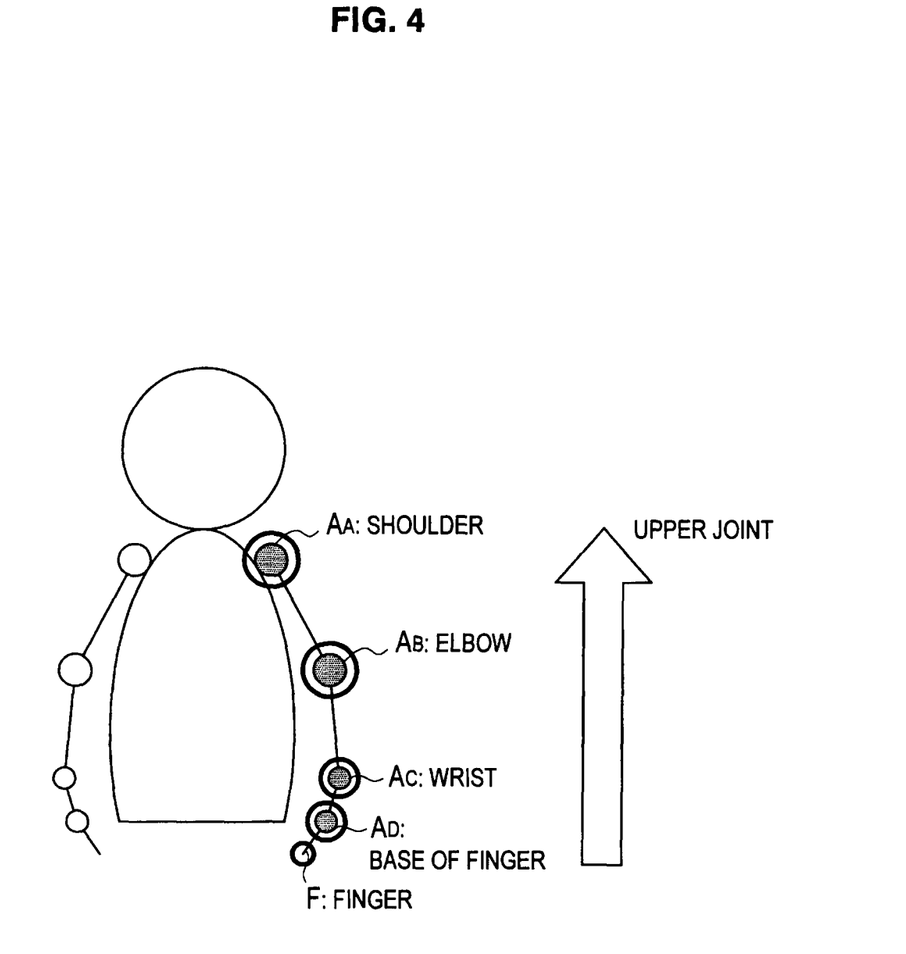
FIG. 4 is an explanatory view showing a relationship between a joint of a human appendage and a reference point.

Next, based on FIG. 3 and FIG. 4, there will be described a functional configuration of the operation control device 100 according to the present exemplary embodiment. Note that FIG. 3 is a functional block diagram showing a functional configuration of the operation control device 100 according to the present exemplary embodiment. FIG. 4 is an explanatory view showing a relationship between a joint of a human appendage (that is, an upper joint) and a reference point disposed along the human appendage and distal to the upper joint. Hereinafter, there will be described the case where a display content on the screen is scrolled by the user moving his/her arm or like appendage up, down, left, and right. In order to decide the direction and speed in which the screen is scrolled, the operation control device 100 according to the present exemplary embodiment detects a reference point and determines, from a relationship between the spatial positions of the reference point and an upper joint, whether or not to execute a control instruction associated with a gesture. In the present exemplary embodiment, the reference point and the upper joint each refer to a joint of the arm or hand of the human body. In additional exemplary embodiments, the reference point and upper joint may each be also set as a joint of another appendage of the human body, or a portion of an appendage including an object such as a remote controller which is operated by the user.

The operation control device 100 according to the present exemplary embodiment includes an input information acquisition section 110, a part detection section 120, a relative position calculation section 130, a movement information calculation section 140, a motion direction determination section 150, an execution section 160, and a setting storage section 170.

The input information acquisition section 110 is a functional section for detecting a plurality of appendages moved by the user, and corresponds to the stereo camera 104 shown in FIG. 2. The input information acquisition section 110 determines whether or not to execute a control instruction and operation processing associated with a gesture of the user, and also acquires an image for recognizing an appendage or portion thereof, which is used for deciding an operation distance in the operation processing. The picked-up image acquired by the input information acquisition section 110 is output to the part detection section 120.

The part detection section 120 recognizes appendages of the human body, such as the arm and hand, included in the picked-up image and a joint positioned between the appendages. The part detection section 120 uses depth information of the picked-up image received by the input information acquisition section 110, and an arbitrary image recognition technique, to thereby recognize the reference point and the upper joint of the user operating the screen. The depth information can be acquired by using, for example, stereo image processing which is capable of measuring a three-dimensional position of an object. Further, the reference point and the upper joint can be recognized by estimating the positions of the reference point and the upper joint with the use of image processing techniques such as shape detection, flesh color detection, and texture matching.

Here, the reference point and the upper joint will be described. As described above, in order to specify the gesture of the user, the operation control device 100 recognizes the reference point, from which the motion of the gesture of the user is detected, and the upper point to identify an axis of the motion with respect to the reference point. In the present exemplary embodiment, arbitrary joints of appendages of the human body are used to represent the reference point. For example, as shown in FIG. 4, the reference point can be set to one of a shoulder $A_A$, an elbow $A_B$, a wrist $A_C$, a base of finger $A_D$, and a finger F, which are joints of the arm. Further, the upper joint is defined as a joint disposed along the appendage and proximate to the reference point on the side of the appendage closer to the shoulder. That is, the upper joint of the finger F is the base of finger $A_D$, the upper joint of the base of finger $A_D$ is the wrist $A_C$, the upper joint of the wrist $A_C$ is the elbow $A_B$, and the upper joint of the elbow $A_B$ is the shoulder $A_A$.

A reference point is set beforehand in the setting storage section 170, for example, and when the reference point is settled, an upper joint is decided. The part detection section 120 extracts a joint as a feature point from the picked-up image, and specifies the reference point and the upper joint thereof by using an existing image recognition technique. Then, the part detection section 120 outputs a spatial position of the reference point and a spatial position of the upper joint to the relative position calculation section 130 and to the movement information calculation section 140.

The relative position calculation section 130 calculates a displacement between the reference point and the upper joint. From the spatial position of the reference point and the spatial position of the upper joint, which are received from the part detection section 120, the relative position calculation section 130 calculates a vector having the upper joint as a starting point and the reference point as an end point (hereinafter, referred to as "displacement vector"). The displacement vector is used for determining whether to execute operation processing associated with a gesture performed by the user. The relative position calculation section 130 outputs the calculated reference vector to the motion direction determination section 150 as relative position information.

The movement information calculation section 140 calculates movement information such as movement distance, movement direction, movement speed, and movement acceleration of the reference point. The movement information calculation section 140 calculates, with respect to the reference point, the position of which is detected by the part detection section 120, the movement distance and the movement direction from a stored spatial position at the previous time to the spatial position at the present time, and outputs the movement distance and the movement direction to the motion direction determination section 150. The movement distance and the movement direction of the reference point calculated by the movement information calculation section 140 are used as information for deciding operation distance and operation direction of an operation object in operation processing to be executed. Further, the movement information calculation section 140 calculates, in response to a requirement from the motion direction determination section 150, the movement acceleration of the reference point, and outputs the movement acceleration to the motion direction determination section 150.

The motion direction determination section 150 determines whether the movement of the reference point is a control movement or a non-control movement, based on a comparison of the movement direction of the reference point and a forward direction of motion. First, the motion direction determination section 150 decides the forward direction of motion, which is to be a criterion for determining whether or not the movement of the reference point is a control movement. The motion direction determination section 150 decides, from the relative position information input from the relative position calculation section 130, the following direction to be the forward direction of motion: a direction of displacement between the upper joint and the reference point, as defined by the direction of the displacement vector from the upper joint to the reference point. Then, the motion direction determination section 150 compares the movement direction of the reference point, which is input from the movement information calculation section 140, and the decided forward direction of motion, and, depending on the comparison result, outputs an control instruction as well as movement information of the reference point to the execution section 160. That is, the motion direction determination section 150 determines whether the motion direction of the reference point corresponds the forward direction, to determine whether the movement of the reference point corresponds to a control movement, and to estimate whether the motion of the reference point is an intended gesture of the user.

Further, the motion direction determination section 150 can, depending on the comparison result, cause the movement information calculation section 140 to calculate the movement acceleration of the reference point and acquire the movement acceleration. In this case, the motion direction determination section 150 can take the movement acceleration of the reference point into consideration and then can determine whether to output a control instruction to the execution section 160.

The execution section 160 executes operation processing corresponding to a gesture performed by the user. In the case where the motion direction determination section 150 determines that the motion of the reference point is the intended gesture performed by the user (that is, a control movement), the execution section 160 functions in accordance with the control instruction of the motion direction determination section 150. The execution section 160 is a gesture search engine for searching operation processing correlated with the gesture performed by the user, and, from the movement information of the reference point, which is input from the motion direction determination section 150, operation processing corresponding to the gesture is searched from a storage section (not shown), and the operation processing is executed. For example, the operation processing executed by the execution section 160 is reflected to output information of an output section (not shown) of a display or a speaker, or to transmit the control instruction to any additional or alternate controllable device.

The setting storage section 170 is a storage section for storing information used for operation control processing, and corresponds to the non-volatile memory shown in FIG. 2. The setting storage section 170 stores, for example, a joint or an object that corresponds to the reference point and the upper point, spatial positions of the reference point and the upper joint, and configuration information of a human anatomy model or the like in which positions of appendages, parts, joints, and the like of the human body are included.

Figure 5:
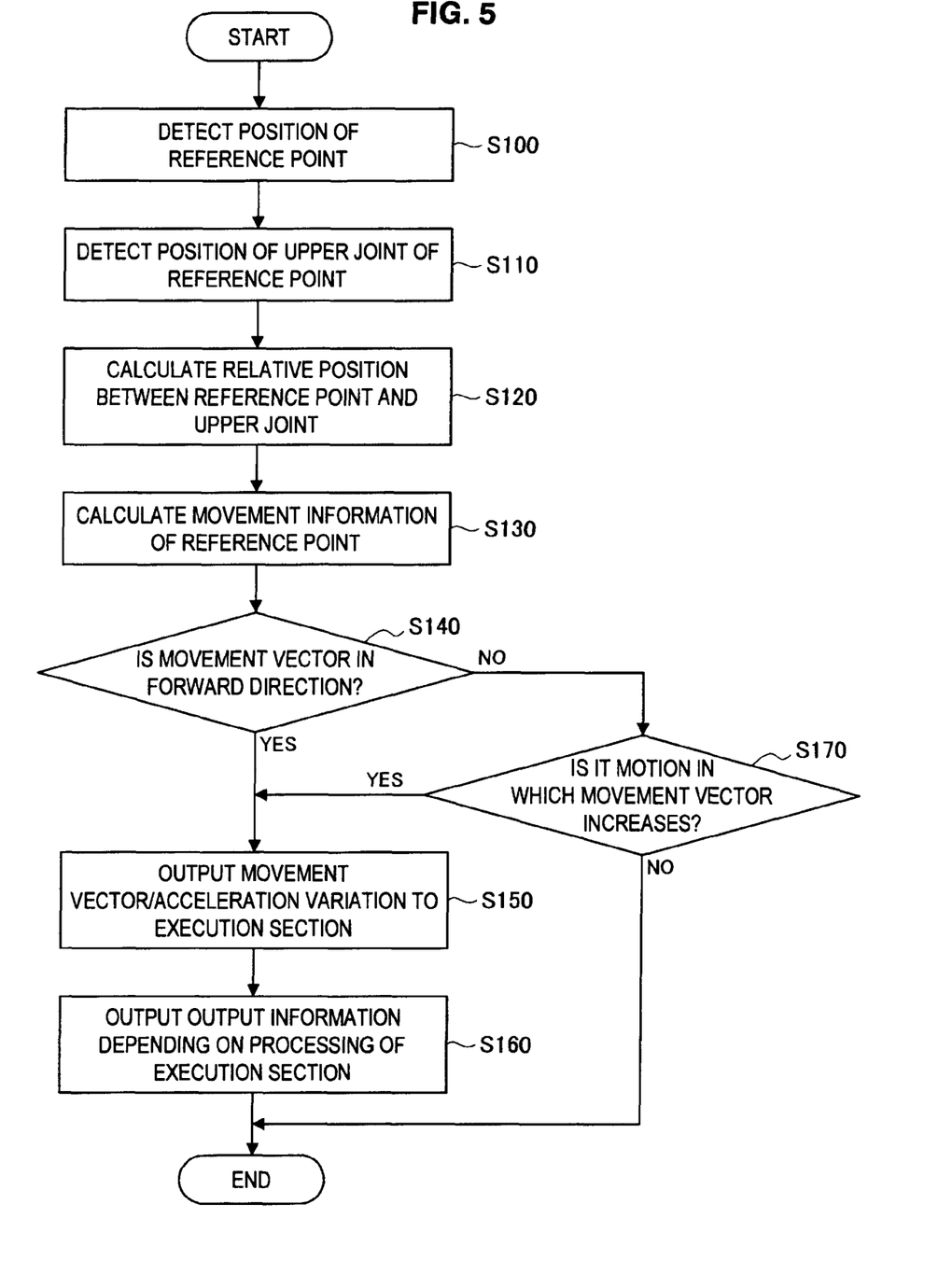
FIG. 5 is a flowchart showing an operation control method performed by the operation control device according to the exemplary embodiment.
Figure 6:
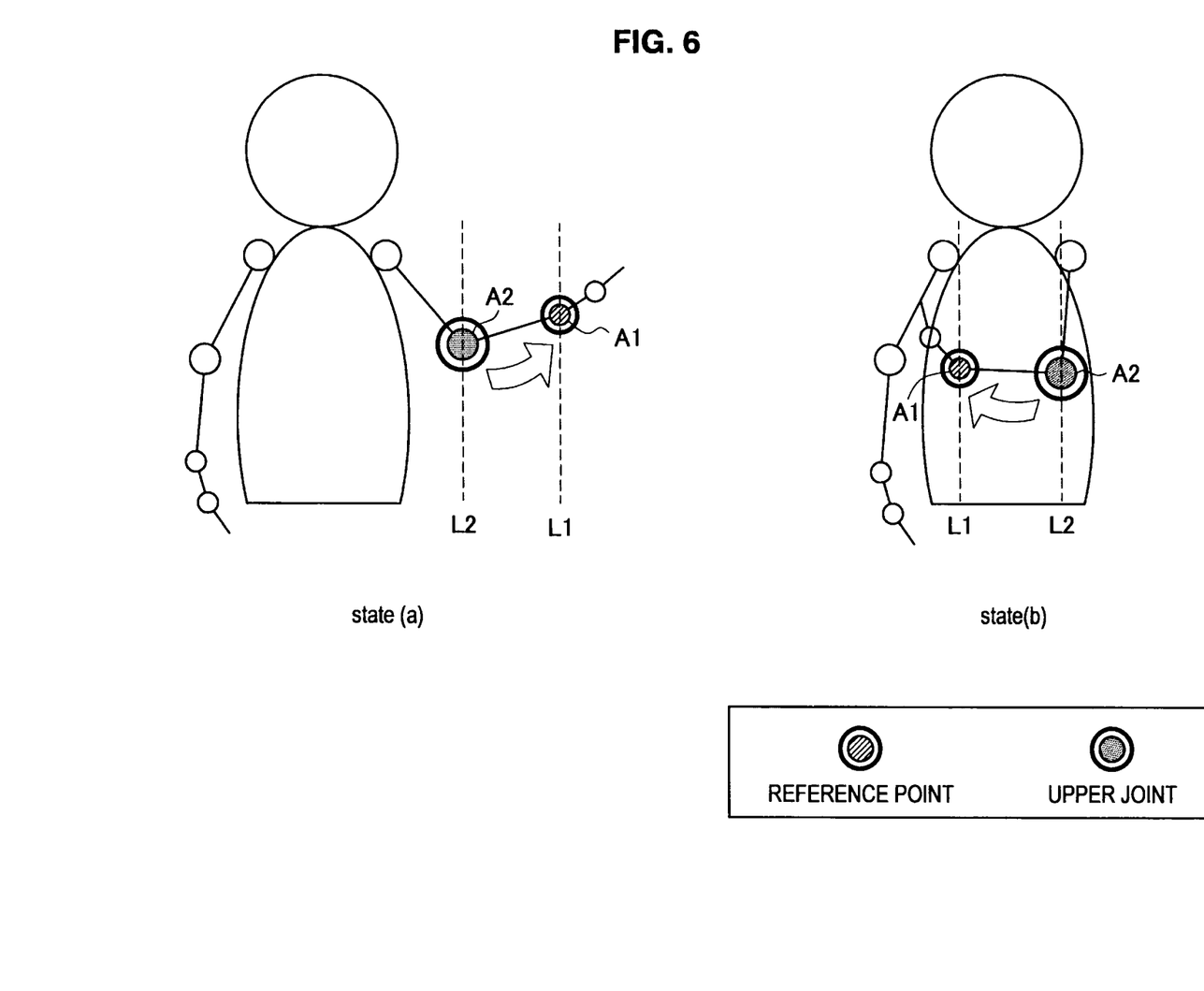
FIG. 6 is an explanatory view about a forward direction of a motion.
Figure 7:
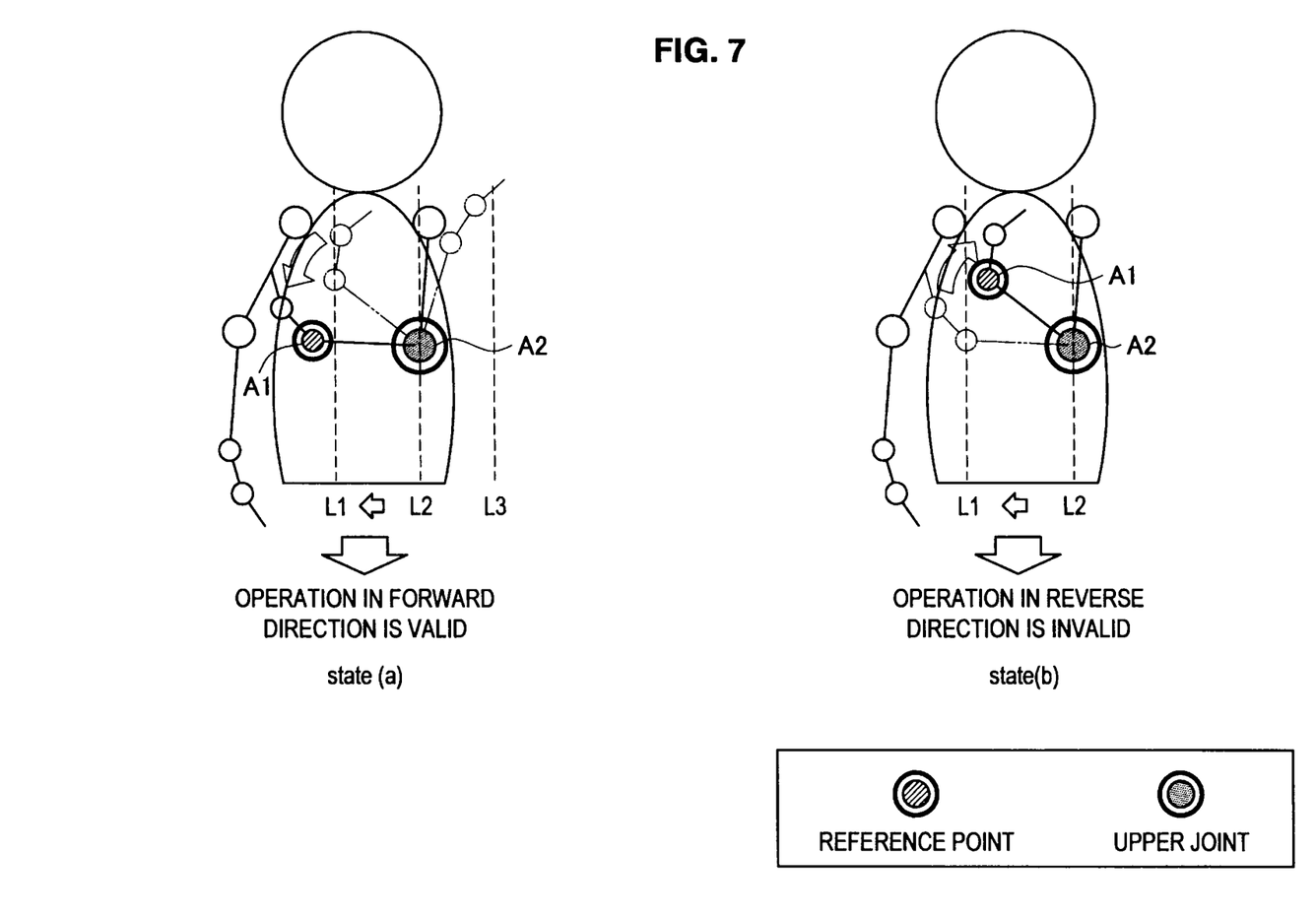
FIG. 7 is an explanatory view showing whether or not operation processing is validated when a wrist is the reference point.
Figure 8:
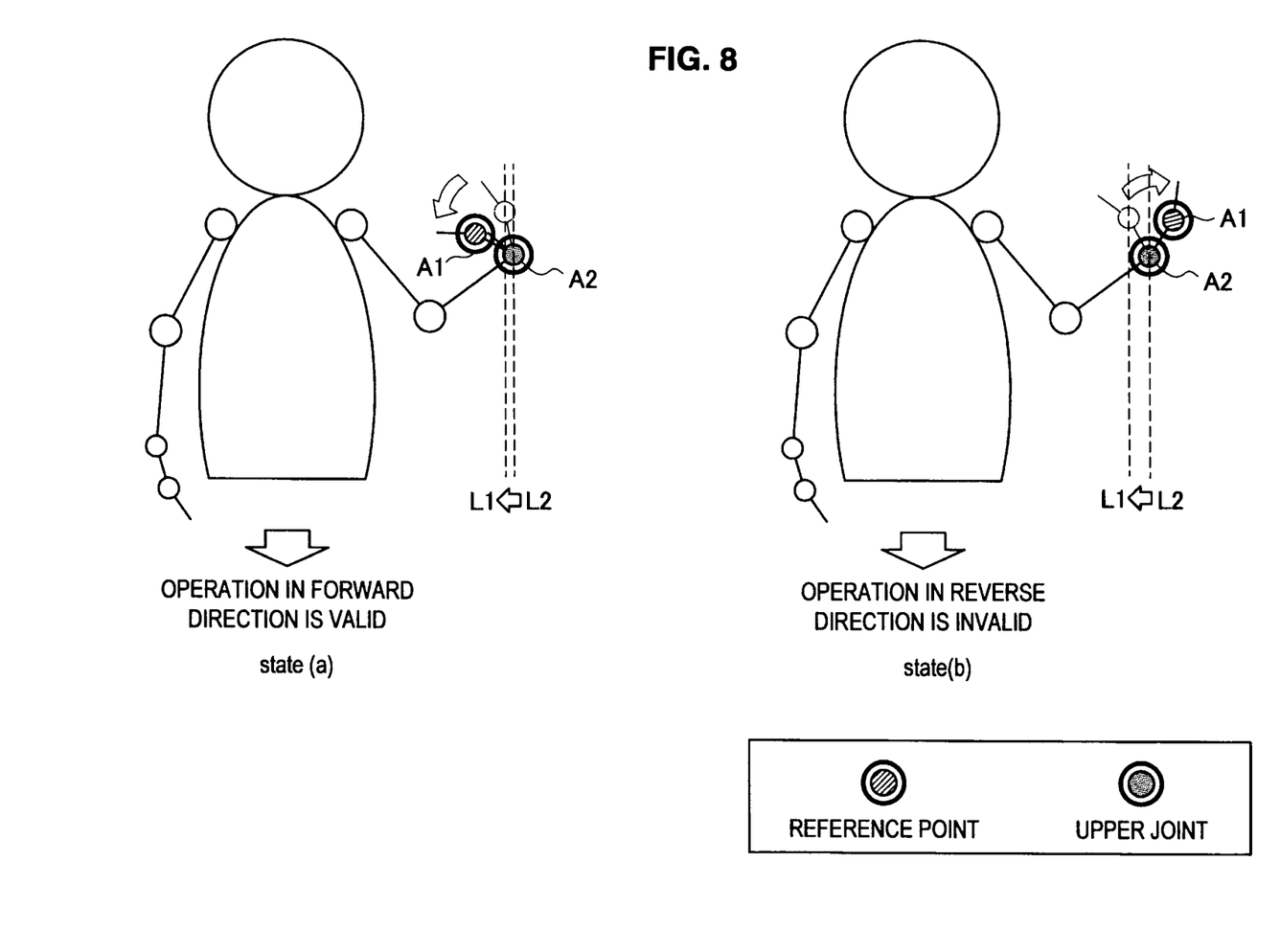
FIG. 8 is an explanatory view showing whether or not operation processing is validated when base of a finger is the reference point.

In the above, the functional configuration of the operation control device 100 according to the present exemplary embodiment has been described. Next, based on FIG. 5 to FIG. 8, there will be described an operation control method performed by the operation control device 100 according to the present exemplary embodiment. Note that FIG. 5 is a flowchart showing the operation control method performed by the operation control device 100 according to the present exemplary embodiment. FIG. 6 is an explanatory view about a forward direction of a motion of a reference point. FIG. 7 is an explanatory view showing whether or not operation processing is validated when a wrist is the reference point. FIG. 8 is an explanatory view showing whether or not operation processing is validated when base of finger is the reference point.

3. Operation Control Method Performed by the Operation Control Device

As described above, the operation control device 100 specifies the reference point and the upper joint, determines whether to execute control instructions and operation processing, and recognizes a gesture performed by the user and executes control instructions and operation processing associated with the gesture. Consequently, in the operation control method performed by the operation processing device 100, first, the part detection section 120 detects a spatial position of the reference point (Step S100). The part detection section 120 extracts joints, which is feature points from the picked-up image acquired by the input information acquisition section 110, using the above-mentioned arbitrary image recognition technique. Then, the part detection section 120 detects the spatial position of the reference point from the extracted joints. The reference point can be specified by using the above-mentioned arbitrary image processing technique, and for example, the spatial position of the joint which is set as the reference point can be estimated by referring to a human anatomy model stored in the setting storage section 170.

Subsequently, the part detection section 120 detects a spatial position of the upper joint with respect to the reference point (Step S110). The part detection section 120 detects, as an upper joint, from among the feature points extracted from the picked-up image, a feature point which is positioned proximate to the reference point on the side closer to the shoulder in terms of positional relationship with the reference point. At this time, in the case where the reference point and the upper joint are overlapped in a depth direction, and the upper joint cannot be detected, the part detection section 120 estimates a likely spatial position of the upper joint from a spatial position of the center of gravity of the human body. The part detection section 120 outputs the spatial position of the reference point and the spatial position of the upper joint, which are calculated in Step S110, as position information to the relative position calculation section 130 and the movement information calculation section 140.

In addition, the relative position calculation section 130 calculates a displacement between the reference point and the upper joint (Step S120). The displacement between the reference point and the upper joint can be calculated as a displacement vector, which is used for determining whether the motion of the user is an intended motion (that is, a control movement). For example, FIG. 6 shows states of flick gestures when the reference point is the wrist. Here, the flick gesture refers to a motion of sweeping or rubbing in space an object list or a Web site displayed on a screen. The flick gesture can be correlated with, as shown in FIG. 1 for example, the operation of scrolling the content list or the like in the direction in which the finger or like appendage is swept.

State (a) in FIG. 6 shows the case where the wrist serving as a reference point A1 is flicked from left to right. At this time, the reference point A1 is positioned at the right side of the elbow serving as an upper joint A2 of the reference point A1. On the other hand, as shown in State (b) of FIG. 6, in the case where the wrist is flicked from right to left, the reference point A1 is positioned at the left side of the upper joint A2. Note that, in the present exemplary embodiment, whether the reference point A1 is positioned at the left side or the right side of the upper joint A2 is determined based on the state where the user faces front. As shown in FIG. 6, it can be seen that the direction in which the user wants to perform a flick gesture is generally the same as a direction of displacement between the reference point A1 with respect to the upper joint A2. That is, the direction of displacement refers to a direction that extends from a position L2 on the horizontal direction, which is a direction perpendicular to the vertical direction of the upper joint A2, towards a position L1 on the horizontal direction of the reference point A1. Accordingly, the relative position calculation section 130 estimates the direction in which the user wants to perform a flick gesture from the positional relationship between the reference point A1 and the upper joint A2, and hence calculates the displacement between the reference point A1 and the upper joint A2.

After that, the movement information calculation section 140 calculates the movement information of the reference point (Step S130). The movement information calculation section 140 calculates movement distance and movement direction (i.e., movement vector) of the reference point from a stored spatial position of the reference point calculated at the previous time and the spatial position of the reference point at the present time. The calculated movement information is output from the movement information calculation section 140 to the motion direction determination section 150.

Next, the motion direction determination section 150 determines whether the direction of the movement vector of the reference point corresponds to a forward direction of motion, which defined by a direction of displacement between the reference position and the upper joint (Step S140). First, the motion direction determination section 150 decides the direction of displacement between the reference point and the upper joint, as specified relative to the upper joint, to be the forward direction. Then, the motion direction determination section 150 determines whether the direction of the movement vector of the reference point corresponds to the forward direction.

The determination on whether the movement direction of the reference point corresponds to the forward direction can be based on an angle between the movement vector of the reference point and the displacement vector between the reference point and the upper joint, for example. That is, when the angle between the movement vector and the displacement vector is 0°, the motion direction determination section 150 determines that the direction of the movement vector corresponds to the direction of the displacement vector. At that time, even though the direction of the movement vector of the reference point does not exactly correspond to the direction of the displacement vector, the direction of the movement vector of the reference point can be determined to be the forward direction when within a predetermined angular range of the direction of the displacement vector. For example, the upward direction with respect to the direction of gravitational force is set as a reference angle (0°), and the direction of the movement vector can be defined depending on the case where a gradient θ of the movement vector is in the region of 0°<θ<180° and in the case where the gradient θ of the movement vector is in the region of −180°<θ<0°. In other words, when the movement vector is decomposed into a component in the vertical direction and a component in the horizontal direction, which is a direction perpendicular to the vertical direction, a direction of the horizontal component of the movement vector can be used as a direction of the movement vector. In the same manner as for the displacement vector, the direction of the horizontal component is used as a direction of the displacement vector, that is, the forward direction. The motion direction determination section 150 can determine whether the thus determined direction of the movement vector corresponds to the forward direction.

For example, FIG. 7 shows a forward direction and a reverse direction of motion of the joint to be detected in the case where the wrist is set to be the reference point and the elbow is set to be the upper joint. In FIG. 7, the forward direction refers to the direction that extends from a position L2 on the horizontal direction of the upper joint A2 towards a position L1 on the horizontal direction of the reference point A1.

As shown in State (a) of FIG. 7, when the user is seen from the front and the reference point A1 is positioned at the left side of the upper joint A2, and in the case where the reference point A1 is moved in the left direction in a manner that the reference point A1 separates away from the upper joint A2, the direction of the movement vector of the reference point A1 corresponds the forward direction, as defined by the direction of the reference point A1 with respect to the upper joint A2. Therefore, the motion of the reference point is determined to be a control movement, is estimated to be the user's intended motion, and operation processing associated with such a gesture is validated. On the other hand, as shown in State (b) of FIG. 7, when the user is seen from the front and the reference point A1 is positioned at the left side of the upper joint, and in the case where the joint to be detected A1 is moved in to the right in a manner that the reference point A1 heads towards the upper joint A2 side, the direction of the movement vector of the reference point A1 is the reverse direction to the direction of the reference point A1 with respect to the upper joint.

In this case, the motion is determined to be a non-control movement, is estimated to be the user's unintended motion, and operation processing associated with the gesture is not executed.

In the same manner, for example, FIG. 8 shows a forward direction and a reverse direction of motion of the reference point in the case where the base of finger is set to be the reference point and the wrist is set to be the upper joint. In FIG. 8, the forward direction also refers to the direction that extends from a position L2 on the horizontal direction of the upper joint A2 towards a position L1 on the horizontal direction of the reference point A1.

As shown in State (a) of FIG. 8, when the user is seen from the front and the reference point A1 is positioned at the left side of the upper joint A2, and in the case where the reference point A1 is moved in the left direction in a manner that the reference point A1 separates away from the upper joint A2, the direction of the movement vector of the reference point A1 is the forward direction, as defined by the direction of the reference point A1 with respect to the upper joint. Therefore, the motion is estimated to be the user's intended motion, and a control instruction and operation processing associated with such a gesture is executed. On the other hand, as shown in State (b) of FIG. 8, when the user is seen from the front and the reference point A1 is positioned at the left side of the upper joint, and in the case where the reference point A1 is moved in the right direction in a manner that the reference point A1 heads towards the upper joint A2 side, the direction of the movement vector of the reference point A1 is the reverse direction to the direction of the reference point A1 with respect to the upper joint. In this case, the motion is estimated to be the user's unintended motion, and the control instruction and operation processing associated with the gesture is not executed.

In this way, in the case where a natural motion is detected, in which the direction of the movement vector of the reference point corresponds to the forward direction (that is, the direction of the displacement vector), the motion of the reference point is determined to be a control movement associated with the user's intended motion, and the operation processing associated with the gesture is validated. Thus, the intended motion and the unintended motion of the user can be distinguished and detection accuracy in a gesture in space can be enhanced.

Then, in the case where the direction of the movement vector of the reference point is determined to be the forward direction (i.e., the direction of displacement defined by the direction of the reference vector), the motion direction determination section 150 outputs a control instruction as well as the movement vector and movement acceleration of the reference point to the execution section 160 (Step S150). The execution section 160 receives the control instruction, searches operation processing correlated with the gesture estimated from the motion of the reference point from a storage section (not shown), and the operation processing associated with the control instruction is executed (Step S160).

On the other hand, in the case where the direction of the movement vector of the reference point is determined not to correspond to the direction of displacement in Step S140, the motion direction determination section 150 determines whether it is the motion in which the movement vector increases (Step S170). In the case where the direction of the movement vector is the reverse direction, the motion is regarded as the user's unintended motion, but even in such a case, the motion may also be the user's intended motion. Accordingly, in order to accept the motion which is regarded as the user's unintended motion in Step S140 but is actually the user's intended motion, it is determined whether the movement acceleration of the reference point is larger in magnitude that a predetermined, threshold value.

In the case where a flick gesture is performed by moving the reference point, the acceleration of the motion in which the reference point is moved in the direction of operation is generally greater than the acceleration of the motion of returning the reference point to the initial position after moving the same to the operation direction. By using this feature, in the case where there is a motion in which the movement acceleration has a predetermined value or more, the motion is determined to be the user's intended motion, even though the motion has been regarded as the user's unintended motion. In this case, the processing of Step S150 and Step S160 is performed, and the operation processing correlated with the gesture is executed. On the other hand, in the case where the movement acceleration of the reference point is less than the predetermined threshold value, the operation processing correlated with the gesture is not executed, and the operation control processing is completed as it is.

In the above, the operation control method performed by the operation control device 100 according to the present exemplary embodiment has been described. According to the present exemplary embodiment, execution of control instructions and operation processing correlated with the gesture is validated in the case where the direction of the movement of the reference point corresponds to the forward direction, as defined by the direction of displacement between the reference point and the upper joint, the reference point and the upper joint being objects for determining gesture. On the other hand, execution of control instructions and operation processing correlated with the gesture is invalidated in the case where the direction of the movement of the reference point does not correspond to the forward direction, as defined by the direction of displacement between the reference point and the upper joint. Thus, the intended motion and the unintended motion of the user can be distinguished and detection accuracy in a gesture in space can be enhanced.

Further, even in the case where the direction of the movement of the reference point is not the forward direction, and when the acceleration of the motion of the reference point has a predetermined value or more, the motion of the reference point is a control motion. Under such circumstances, the motion of the reference is regarded as the user's intended motion, and execution of control instruction and operation processing can be validated. Thus, the range of accepting the execution of the control instruction and operation processing performed by the gesture of the user is widened, and the user's intended motions can be distinguished more accurately. Note that the operation control shown in FIG. 5 is executed at an arbitrary time when gesture recognition is necessary.

Setting of Take-Over Region of Reference Vector

In the present exemplary embodiment, in the case where the direction of the movement vector of the reference point is the forward direction (that is, the direction of the displacement vector), or even in the case where the direction of the movement vector of the reference point is the reverse direction to the direction of the displacement vector provided that the movement acceleration of the reference point has a predetermined value or more, the control instruction and operation processing associated with the gesture is executed. At that time, even when the direction of the movement vector of the reference point is the reverse direction to the direction of displacement, the validity of the operation processing at the previous time can be taken over during the time in which the range that the reference point is moved in the reverse direction falls within a predetermined range.

For example, as shown in State (a) of FIG. 7, when the user is seen from the front and the reference vector points to the left, and in the case where the reference point A1 is moved in the left direction within the region on the left side of L2 showing a position on the horizontal direction of the upper joint A2, the motion of the reference point is a control movement, and the operation processing is validated. However, when the user wants to flick the reference point A1 repeatedly in the left direction, there is a case, depending on the way the user swings his/her arm, where the reference point A1 is moved from the region on the right side of the position L2, through the position L2, and to the left. In such a case, there can be set a region in which a direction of displacement associated with a previously-stored spatial position of the reference point is taken over in such a manner that, even when the reference point A1 is at the region on the right side of the position L2, the operation performed by the motion of the reference point A2 is validated, the direction of the motion being the reverse direction to the direction of displacement before the reference point A2 passes through the position L2.

In State (a) of FIG. 7, a position L3 may be provided on the right side of the position L2 of the upper joint A2, and the motion direction determination section 150 may determine the validity of the operation processing by taking over the previous direction of displacement between the position L2 and the position L3. In this case, where the reference point A1 is positioned between the position L2 and the position L3, and is being moved to the left, the direction of the actual displacement is to the right, and the direction of the motion of the reference point A1 is determined to be the reverse direction, but in the case where the direction of the previous displacement is to the left, it is determined to be the forward direction. Thus, the repeatedly performed flick gestures can be recognized more accurately and it becomes possible to execute the operation processing that answers the motion of the user.

Change of Reference Vector

Further, in the description above, the validity of the operation processing is determined based on the direction of displacement between the reference point and the upper joint, and from the direction of the movement vector of the reference point. However, there may be a case where it is difficult to perform the determination depending on the setting of the reference point and the upper point, and the movement direction of the reference point. For example, there is considered the case where, when the base of finger is set to be the reference point, and the wrist is set to be the upper point, the user moves the base of his/her finger in up and down directions. In this case, when a reference vector is defined to be a vector having the wrist serving as the upper joint as the starting point and the base of finger serving as the reference point as the end point, in the same manner as described above, and when the user moves the base of his/her finger in a natural posture, the direction of displacement is almost constantly in a vertically upward direction. Accordingly, it is difficult to validate operation processing performed by a motion in which the reference point is moved in a vertically downward direction.

In such a case, the direction of displacement may be changed. For example, when the base of finger serving as the reference point is moved up and down by using, as a supporting point, the wrist serving as the upper point, an intermediate spatial position can be set to identify an intermediate direction of displacement, the intermediate spatial position being between a spatial position at which the base of finger is moved to a maximum extent in the vertically upward direction and a spatial position at which the base of finger is moved to a maximum extent in the vertically downward direction. At that time, the intermediate direction of displacement is calibrated and decided before the motion is performed, and is stored beforehand in the setting storage section 170. By changing the setting of the direction of displacement depending on the motion, it can be accurately determined whether the motion performed by the user is the intended motion or the unintended motion. Further, the user can perform the motion in a natural posture.

Note that the case of flicking the point to be detected in left/right direction and the case of flicking the point to be detected in up/down direction can be distinguished by, for example, decomposing the movement vector of the reference point into gravitational (i.e., vertical) and horizontal components, comparing a magnitude of the gravitational component and a magnitude of the horizontal component, and deciding the larger component corresponds flick direction. However, the decomposition of the movement vector is not limited to horizontal and vertical components, and in additional exemplary embodiments, the movement vector may be decomposed into any set of mutually-orthogonal components.

In the above, the preferred exemplary embodiment of the present invention has been described in detail with reference to the appended drawings, but is not limited thereto. It should be understood by those skilled in the art that various modifications, combinations, sub-combinations and alterations may occur depending on design requirements and other factors insofar as they are within the scope of the appended claims or the equivalents thereof.

Note that it is also possible to provide a computer program for causing a computer to function as the operation control device described in the above exemplary embodiment. The computer program is stored in a storage device included in the computer, and causes the computer to function as the operation control device by being read and executed by CPU included in the computer. In this case, the computer program can cause the computer to function as the operation control device by using, as input information, image information acquired from an input information acquisition device such as a stereo camera. Further, it is also possible to provide a computer-readable recording medium in which the computer program is recorded. The recording medium includes, for example, a magnetic disk and an optical disk.

The present application contains subject matter related to that disclosed in Japanese Priority Patent Application JP 2009-147726 filed in the Japan Patent Office on Jun. 22, 2009, the entire content of which is hereby incorporated by reference.

What is claimed is:

1. A computer-implemented method for controlling a controllable device by distinguishing between a control movement and a non-control movement, the control movement being associated with a control instruction of the controllable device, the method comprising steps, performed by a processor, of:
   receiving a spatial position of a joint of a human appendage, and a spatial position of reference point disposed along the human appendage and distal to the joint;
   identifying a direction of displacement between the joint and the reference point based on the received spatial positions, wherein the direction of displacement is specified relative to the joint;
   computing a direction of a movement of the reference point with respect to the joint, based on a comparison between a stored spatial position of the reference point and the received spatial position of the reference point, wherein the direction of movement is specified relative to the reference point;

computing an acceleration associated with the movement of the reference point, based on at least the received spatial position of the reference point and the stored spatial position of the reference point;

determining whether the movement of the reference point is a control movement or a non-control movement, based on at least a comparison of the identified direction of displacement and the computed direction of movement; and executing the control instruction when the movement is determined to be a control movement, wherein the determining step comprises determining that the movement of the reference point is a control movement when the computed direction of movement fails to correspond to the identified direction of displacement, and when the computed acceleration exceeds a threshold value.

2. The method of claim 1, wherein the joint is a first joint of the human appendage and the reference point is a second joint of the human appendage.

3. The method of claim 1, further comprising:
storing the received spatial position of the reference point in a storage device.

4. The method of claim 1, wherein the determining step comprises:
determining that the movement of the reference point is a control movement when the computed direction of movement corresponds to the identified direction of displacement.

5. The method of claim 1, wherein the computing step comprises:
generating a vector associated with the movement of the reference point;
decomposing the generated vector into a first component and a second component that is orthogonal to the first component; and
specifying the direction of movement to be one of a direction of the first component or a direction of the second component, based on a comparison of a magnitude of the first component and a magnitude of the second component.

6. The method of claim 5, wherein the specifying step comprises:
specifying the direction of movement as the direction of the first component, when the magnitude of the first component exceeds the magnitude of the second component.

7. The method of claim 5, wherein the specifying step comprises:
specifying the direction of movement as the direction of the second component, when the magnitude of the second component exceeds the magnitude of the first component.

8. The method of claim 5, wherein the first component is a horizontal component, and the second component is a vertical component.

9. The method of claim 1, wherein the determining step comprises:
calculating a direction of displacement between the joint and the stored spatial position of the reference point, when the computed direction of movement fails to correspond to the identified direction of displacement; and
determining that the movement of the reference point is a control movement, when the computed direction of movement corresponds to the calculated direction of displacement.

10. The method of claim 1, further comprising:
transmitting the control instruction to the controllable device.

11. The method of claim 1, wherein the receiving step comprises:
receiving, from a detection device, at least one of the spatial position of the joint or the spatial position of the reference point.

12. The method of claim 1, further comprising:
calculating an intermediate spatial position, disposed along the direction of movement, between the received spatial position of the reference point and the stored spatial position of the reference point,
wherein:
the identifying step comprises identifying an intermediate direction of displacement between the received spatial position of the joint and the intermediate spatial position; and
the determining step comprises determining that the movement of the reference point is a control movement when the computed direction of movement corresponds to the intermediate direction of displacement.

13. The method of claim 1, wherein the spatial position of the joint of the spatial position of the reference point together identify an axis of motion of the movement.

14. An apparatus for controlling a controllable device by distinguishing between a control movement and a non-control movement, the control movement being associated with a control instruction of the controllable device, the apparatus comprising:
a storage device; and
a processor coupled to the storage device, wherein the storage device stores a program for controlling the processor, and wherein the processor, being operative with the program, is configured to cause the apparatus to:
receive a spatial position of a joint of a human appendage, and a spatial position of reference point disposed along the human appendage and distal to the joint;
identify a direction of displacement between the joint and the reference point based on the received spatial positions, wherein the direction of displacement is specified relative to the joint;
compute a direction of a movement of the reference point with respect to the joint, based on a comparison between a stored spatial position of the reference point and the received spatial position of the reference point, wherein the direction of movement is specified relative to the reference point;
compute an acceleration associated with the movement of the reference point, based on at least the received spatial position of the reference point and the stored spatial position of the reference point;
determine whether the movement of the reference point is a control movement or a non-control movement, based on at least a comparison of the identified direction of displacement and the computed direction of movement; and
execute the control instruction when the movement is determined to be a control movement,
wherein the movement of the reference point is determined to be a control movement when the computed direction of movement fails to correspond to the identified direction of displacement, and when the computed acceleration exceeds a threshold value.

15. The apparatus of claim 14, wherein the joint is a first joint of the human appendage and the reference point is a second joint of the human appendage.

16. The apparatus of claim 14, wherein the processor is further configured to cause the apparatus to:
store the received spatial position of the reference point in the storage device.

17. The apparatus of claim 14, wherein the processor is further configured to cause the apparatus to:
determine that the movement of the reference point is a control movement when the computed direction of movement corresponds to the identified direction of displacement.

18. The apparatus of claim 14, wherein the processor is further configured to cause the apparatus to:
generate a vector associated with the movement of the reference point;
decompose the generated vector into a first component and a second component that is orthogonal to the first component; and
specify the direction of movement to be one of a direction of the first component or a direction of the second component, based on a comparison of a magnitude of the first component and a magnitude of the second component.

19. The apparatus of claim 18, wherein the processor is further configured to cause the apparatus to:
specify the direction of movement as the direction of the first component, when the magnitude of the first component exceeds the magnitude of the second component.

20. The apparatus of claim 18, wherein the processor is further configured to cause the apparatus to:
specify the direction of movement as the direction of the second component, when the magnitude of the second component exceeds the magnitude of the first component.

21. The apparatus of claim 18, wherein the first component is a horizontal component, and the second component is a vertical component.

22. The apparatus of claim 14, wherein the processor is further configured to cause the apparatus to:
calculate a direction of displacement between the joint and the stored spatial position of the reference point, when the computed direction of movement fails to correspond to the identified direction of displacement; and
determine that the movement of the reference point is a control movement, when the computed direction of movement corresponds to the calculated direction of displacement.

23. The apparatus of claim 14, wherein the processor is further configured to cause the apparatus to:
transmit the control instruction to the controllable device.

24. The apparatus of claim 14, wherein the processor is further configured to cause the apparatus to:
receive, from a detection device, at least one of the spatial position of the joint or the spatial position of the reference point.

25. The apparatus of claim 14, wherein the processor is further configured to:
calculate an intermediate spatial position, disposed along the direction of movement, between the received spatial position of the reference point and the stored spatial position of the reference point,
wherein:
the processor is further configured to cause the apparatus to identify an intermediate direction of displacement between the received spatial position of the joint and the intermediate spatial position; and
the processor is further configured to cause the apparatus to determine that the movement of the reference point is a control when the computed direction of movement corresponds to the intermediate direction of displacement.

26. A non-transitory computer-readable medium storing instructions that, when executed by a processor, perform a method for controlling a controllable device by distinguishing between a control movement and a non-control movement, the control movement being associated with a control instruction of the controllable device, the method comprising steps, performed by a processor, of:
receiving a spatial position of a joint of a human appendage, and a spatial position of reference point disposed along the human appendage and distal to the joint;
identifying a direction of displacement between the joint and the reference point based on the received spatial positions, wherein the direction of displacement is specified relative to the joint;
computing a direction of a movement of the reference point with respect to the joint, based on a comparison between a stored spatial position of the reference point and the received spatial position of the reference point, wherein the direction of movement is specified relative to the reference point;
computing an acceleration associated with the movement of the reference point, based on at least the received spatial position of the reference point and the stored spatial position of the reference point;
determining whether the movement of the reference point is a control movement or a non-control movement, based on at least a comparison of the identified direction of displacement and the computed direction of movement; and
executing the control instruction when the movement is determined to be a control movement,
wherein the determining step comprises determining that the movement of the reference point is a control movement when the computed direction of movement fails to correspond to the identified direction of displacement, and when the computed acceleration exceeds a threshold value.

27. The method of claim 1, wherein the computing step comprises:
generating a movement vector associated with the movement of the reference point, from the received spatial position of the reference point and the stored spatial position of the reference point;
generating a displacement vector associated with the displacement between the position of the joint and the reference position; and
determining whether the movement of the reference point is the control movement or the non-control movement, based on a comparison between the movement vector and the displacement vector.

28. The method of claim 27, wherein the movement of the reference point is determined to be the control movement when a direction of the movement vector is within 90° of a direction of the displacement vector.

* * * * *